UNITED STATES PATENT OFFICE.

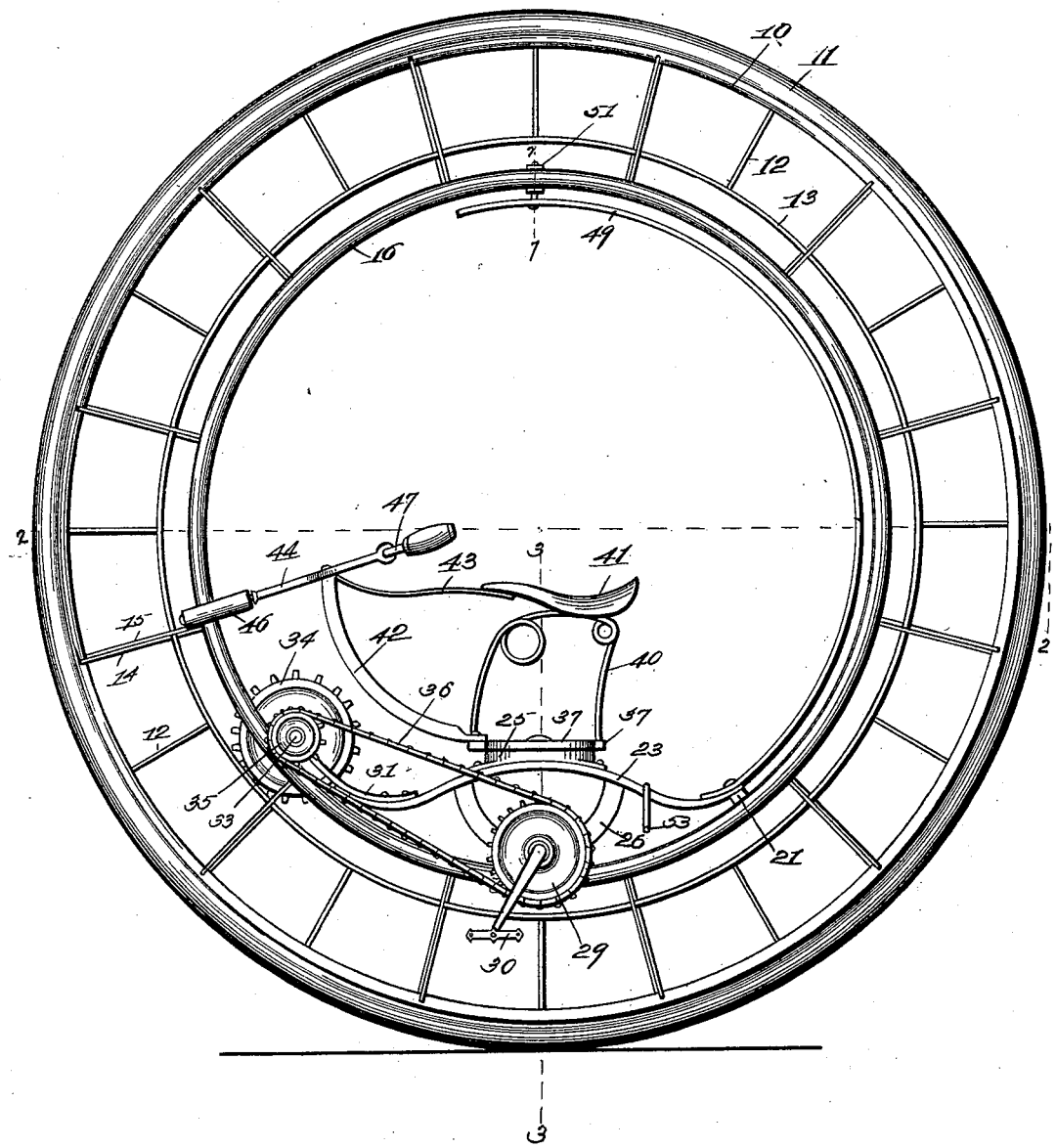

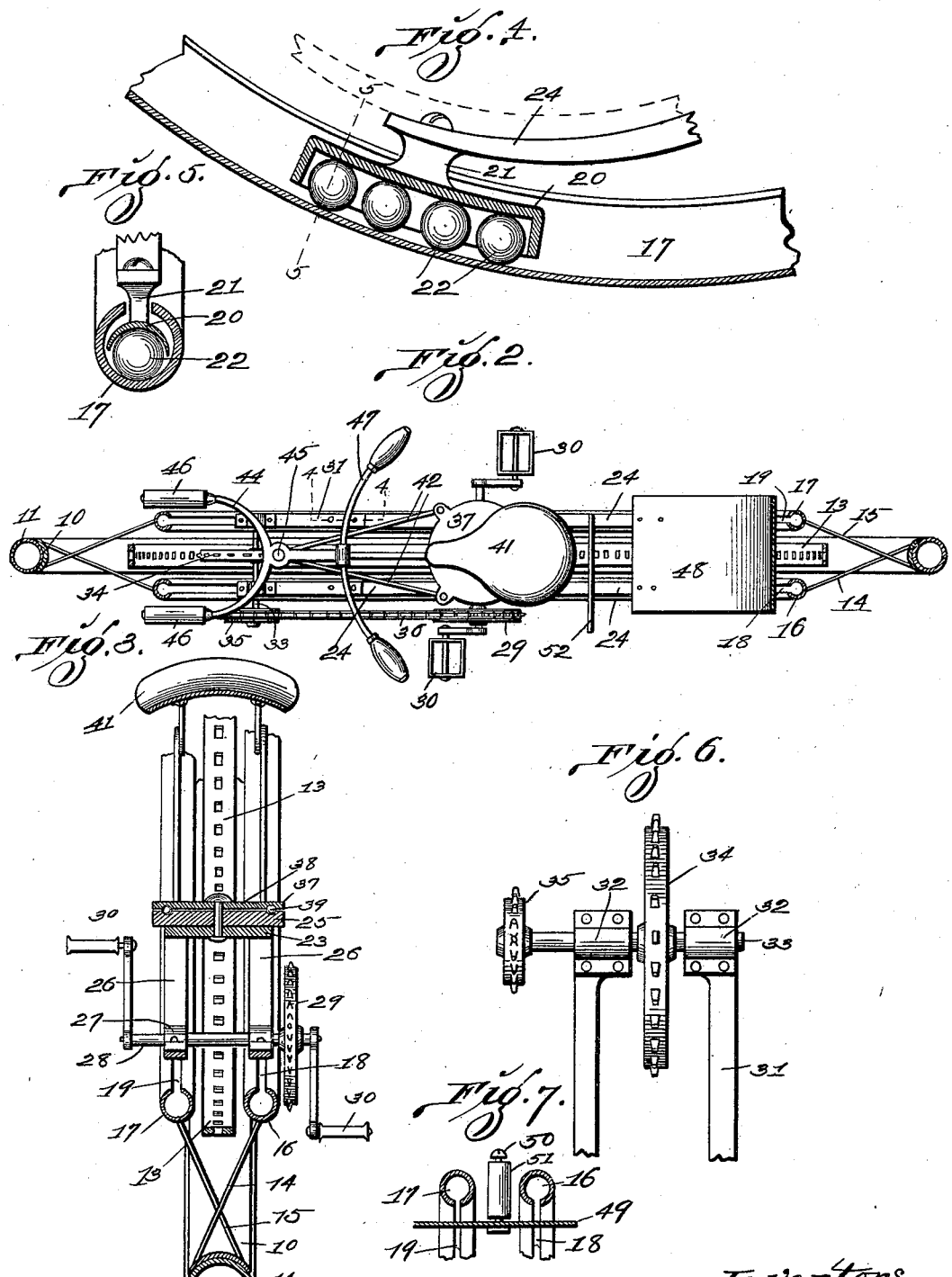

JACOB W. DORNSEIF AND OBADIAH Y. MOSER, OF WORDEN, ILLINOIS.

UNICYCLE.

SPECIFICATION forming part of Letters Patent No. 589,249, dated August 31, 1897.

Application filed March 29, 1897. Serial No. 629,768. (No model.)

*To all whom it may concern:*

Be it known that we, JACOB W. DORNSEIF and OBADIAH Y. MOSER, of the city of Worden, county of Madison, State of Illinois, have invented certain new and useful Improvements in Hubless Inside-Riding Cycles, of which the following is a full, clear, and exact description, reference being had to the accompanying drawings, forming a part hereof.

Our invention relates to unicycles; and it consists of the novel construction, combination, and arrangement of parts, hereinafter shown, described, and claimed.

Figure 1 is a side elevation. Fig. 2 is a horizontal section taken approximately on the line 2 2 of Fig. 1. Fig. 3 is a vertical transverse section taken approximately on the line 3 3 of Fig. 1. Fig. 4 is a vertical longitudinal section taken approximately on the line 4 4 of Fig. 2. Fig. 5 is a transverse sectional view taken approximately on the line 5 5 of Fig. 4. Fig. 6 is an enlarged plan view of the forward gearing shown in Figs. 1 and 2. Fig. 7 is a transverse sectional view taken approximately on the line 7 7 of Fig. 1.

The object of our invention is to construct a wheel in which the rider will be located inside of the rim of the wheel or cycle.

Referring by numerals to the drawings, 10 is the rim, which may be of any ordinary construction. 11 is the cushioned tire, which may be of any ordinary construction and engages the rim 10 in the ordinary way. The distinguishing feature of the rim 10 and the tire 11 is the fact that their diameters are several times as great as the diameters of ordinary bicycle-wheels.

Projecting inwardly from the rim 10 toward the axial center of the wheel are the spokes 12, and the circular rack 13 is attached to the inner ends of said spokes 12 in a position in alinement with the rim 10 and concentric relative to said rim 10. The spokes 14 and 15 project inwardly from the rim 10 to points slightly inside of the rack 13. The spokes 14 and 15 are attached at their outer ends to near the edges of the rim 10, and said spokes are inclined inwardly and crossed, as shown in Figs. 2 and 3, the inner ends of said spokes being somewhat farther apart than their outer ends.

The slotted tubular rings 16 and 17 are attached to the inner ends of the spokes 14 and 15, respectively, said rings 16 and 17 being mounted in parallel positions relative to each other and in positions concentric with the rim 10 and the rack 13, and said tubular rings are positioned slightly inside of the rack 13 and equal distance from said rack upon opposite sides thereof. The slots 18 and 19 of the tubular rings 16 and 17 are formed from their inner faces and extend entirely around the wheel, said slots being endless.

The bearing-boxes 20 (shown in Figs. 4 and 5) are placed in the tubular rings 16 and 17, with the posts 21 projecting inwardly through the slots 18 and 19. The boxes 20 are semicircular in cross-section, as shown in Fig. 5, and the ends of the boxes are closed, as shown in Fig. 4. The boxes are placed in position in the tubular rings with their open sides downwardly, and the bearing-balls 22 are placed in said boxes. Two of the bearing-boxes 20 and two sets of the bearing-balls 22 are placed in each of the slotted tubular rings 16 and 17.

The plate 23 is placed in a substantially horizontal position and the ends of said plate are bifurcated, thus forming the arms 24, and the free end of each of said arms 24 is attached to the post 21, carrying a bearing-box 20. The plate 25 is rigidly fixed to the plate 23.

A pair of bars 26 are bent into semicircles, and the ends of said bars 26 are attached to the plate 23. The transversely-alined bearings 27 are carried by the bars 26, and the pedal-shaft 28 is mounted in said bearings 27. A sprocket-wheel 29 is mounted upon the shaft 28, outside of the bearings 27, and the pedals 30 are mounted upon the extreme outer ends of said shaft 28. The arms 31 are attached to the forward ends of the forward ones of the arms 24, and the transversely-alined bearings 32 are carried by the forward ends of the arms 31. The shaft 33 is mounted in the bearings 32. The toothed wheel 34 is mounted upon the shaft 33, between the bearings 32, and the teeth of said wheel 34 engage the rack 13. The sprocket-wheel 35 is mounted upon one end of the shaft 33, in alinement with the sprocket-wheel 29, and the sprocket-chain 36 connects said sprocket-wheels 29 and 35.

The plate 37 is placed above the plate 25, and the bolt 38 forms a swiveled connection between said plates 25 and 37. The upper face of the plate 25 and the lower face of the plate 37 are grooved concentrically to the bolt 38, and the balls 39 are placed in said grooves, thus forming an antifriction swiveled connection between the plates 25 and 37. The springs 40 extend upwardly from the plate 37 and the seat 41 is attached to said springs 40. The arms 42 extend forwardly and upwardly from the plate 37, their forward ends being attached together, and the brace 43 connects the forward ends of the arms 42 with the forward part of the seat 41.

The three-armed lever 44 is pivotally attached to the forward ends of the arms 42 by means of the bolt 45, two of the arms of said lever extending outwardly and forwardly from said pivot and carrying the rollers 46 upon their free ends, and one of said arms extending backwardly from said pivot and having the handle-bar 47 attached to its backward or free end. The mud-fender 49 is attached to the rear ends of the rear ones of the arms 24 and extends backwardly and upwardly in the form of a semicircle and to a point directly above the seat 41. A bolt 50 has its lower end fixed in the upper end of the mud-fender 49 and projects upwardly between the tubular rings 16 and 17, and the roller 51 is mounted upon said bolt in a vertical position.

A bar 52 is attached in position transversely of the rear ends of the arms 24 and projects laterally and downwardly from said arms, thus forming the step 53.

The rider sits astride the seat 41 and operates the pedals 30 in the usual way, thus operating the shaft 33 and causing the toothed wheel 34 to engage the rack 13, thus causing the wheel to roll forwardly or backwardly, as desired. The wheel is guided by manipulating the handle-bar 47 in the usual way and causing the rollers 46 to engage one side or the other of the tubular rings 16 and 17. The operation of steering is aided and perfected by the poising of the body.

The slotted tubular rings 16 and 17, with the bearings operating therein, form sliding connections between the seat 41 and the rim of the wheel.

We claim—

1. In a device of the class described, a wheel-rim, spokes projecting inwardly from said wheel-rim, an endless rack attached to the inner ends of said spokes and in a position concentric with said wheel-rim, a second series of spokes projecting inwardly from said wheel-rim, a pair of rings 16 and 17 mounted one upon each side and a short distance inside of said endless rack and attached to the inner ends of said second series of spokes; said rings 16 and 17 being tubular and having the slots 18 and 19 formed from their inner faces, bearing-boxes mounted within said rings 16 and 17, balls mounted within said bearing-boxes and engaging the inner faces of said rings, posts projecting outwardly from said bearing-boxes through said slots, a seat mounted inside of said endless rack and attached to said posts, a pedal-shaft rotatably mounted and rigidly connected to the seat-frame, a counter-shaft mounted parallel with said pedal-shaft, a chain connecting said pedal-shaft with said counter-shaft and a toothed wheel upon said counter-shaft and engaging said endless rack, substantially as specified.

2. In a device of the class described, a wheel-rim, spokes projecting inwardly from said wheel-rim, an endless rack attached to the inner ends of said spokes in a position concentric with said wheel-rim, a pair of rings 16 and 17 mounted one upon each side and a short distance inside of said endless rack; said rings 16 and 17 being tubular and having the slots 18 and 19 formed from their inner faces; bearing-blocks mounted within said rings 16 and 17, balls within said bearing-blocks and engaging said rings, posts projecting outwardly from said bearing-blocks through said slots, a seat-frame attached to said posts, a seat, bearings forming a swiveled connection between said seat and said seat-frame, a pedal-shaft mounted in said seat-frame, a counter-shaft mounted in said seat-frame, connections between said pedal-shaft and said counter-shaft, a toothed wheel upon said counter-shaft and engaging said endless rack, a handle-bar mounted adjacent said seat, a three-armed pivoted lever attached to the base of the seat, two of the arms of said lever projecting forwardly upon opposite sides of said rings, and a handle-bar attached to the free end of the third arm of said lever and adjacent to said seat, substantially as specified.

In testimony whereof we affix our signatures in presence of two witnesses.

JACOB W. DORNSEIF.
OBADIAH Y. MOSER.

Witnesses:
EDWARD E. LONGAN,
MAUD GRIFFIN.